Feb. 1, 1966  M. L. CRIPE  3,232,676
ANTI-SKID SYSTEM
Filed Jan. 2, 1962  3 Sheets-Sheet 1
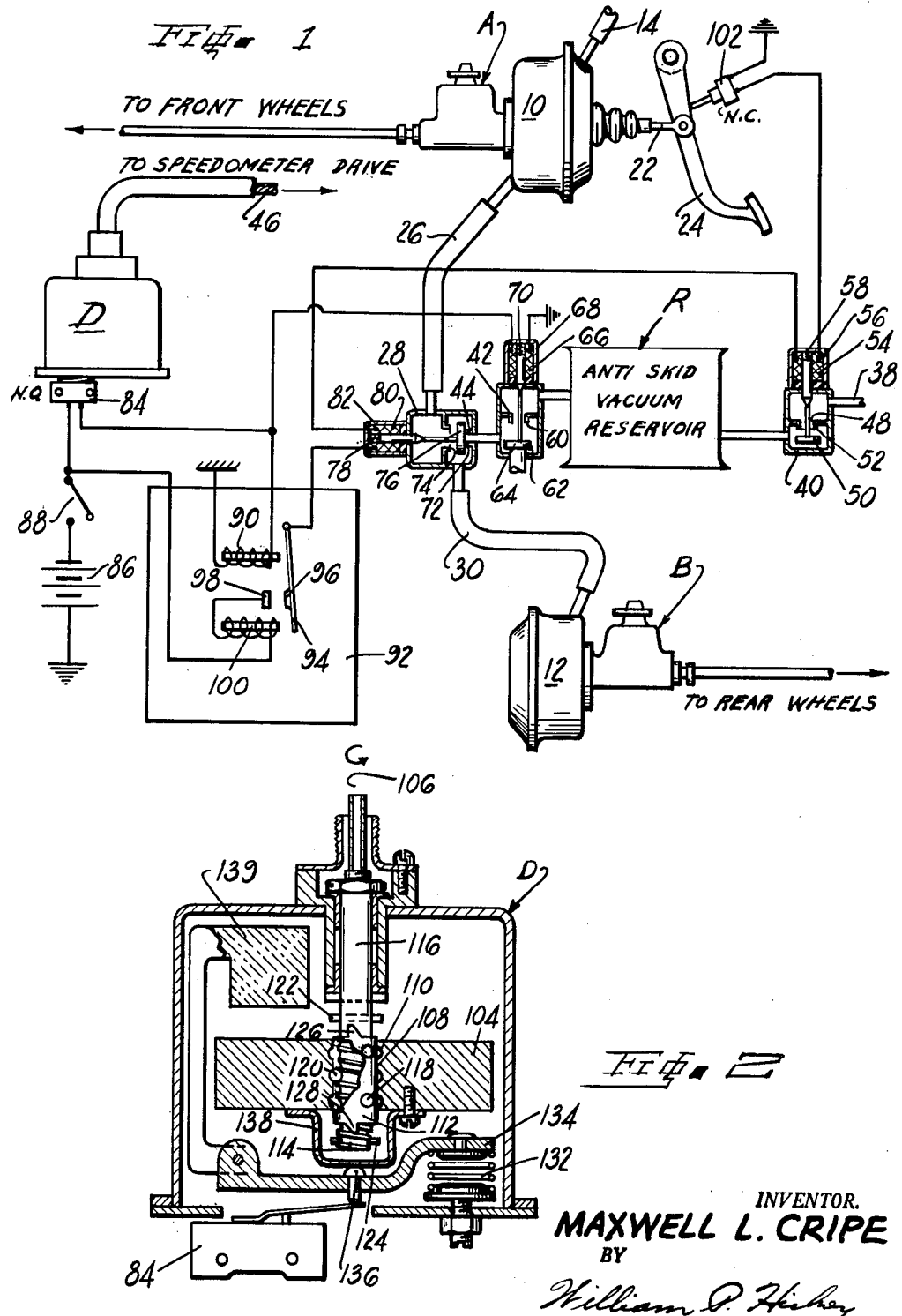
INVENTOR.
MAXWELL L. CRIPE
BY
William P. Hickey

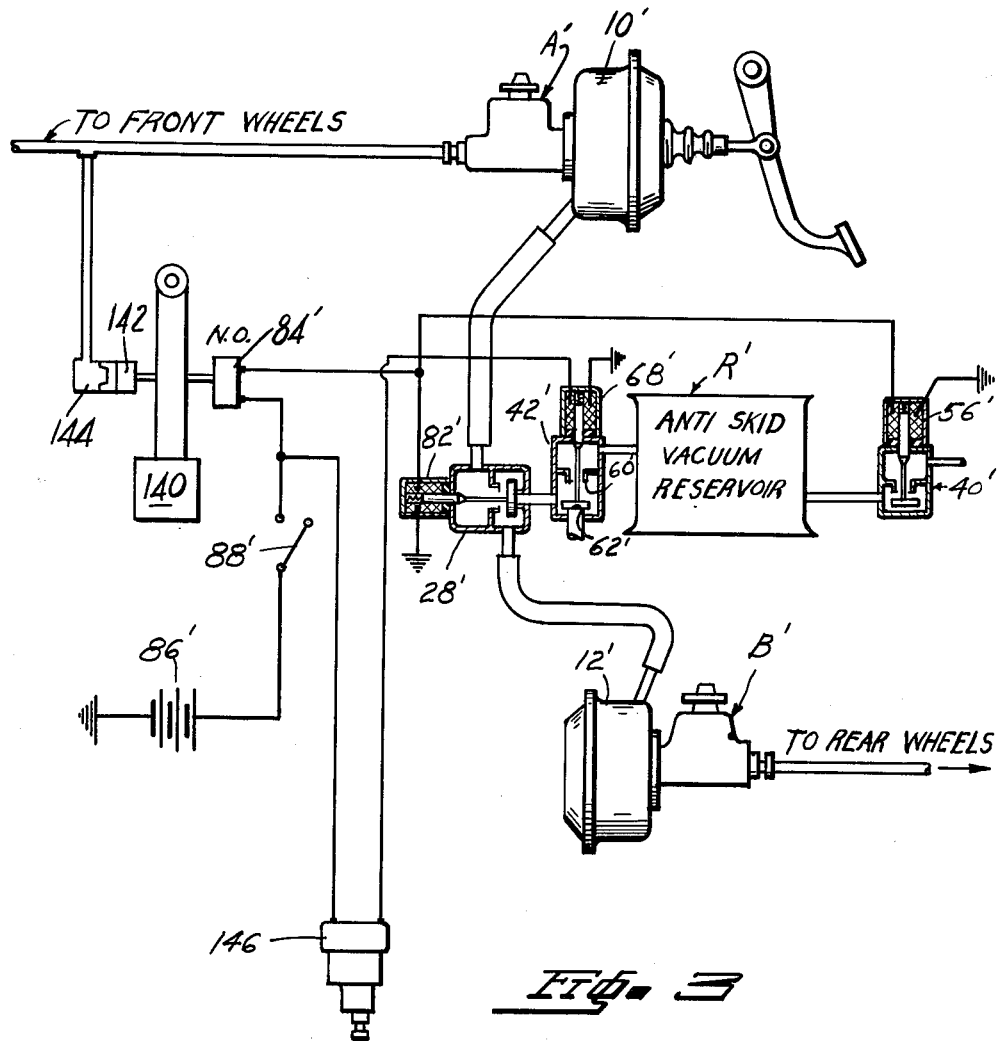

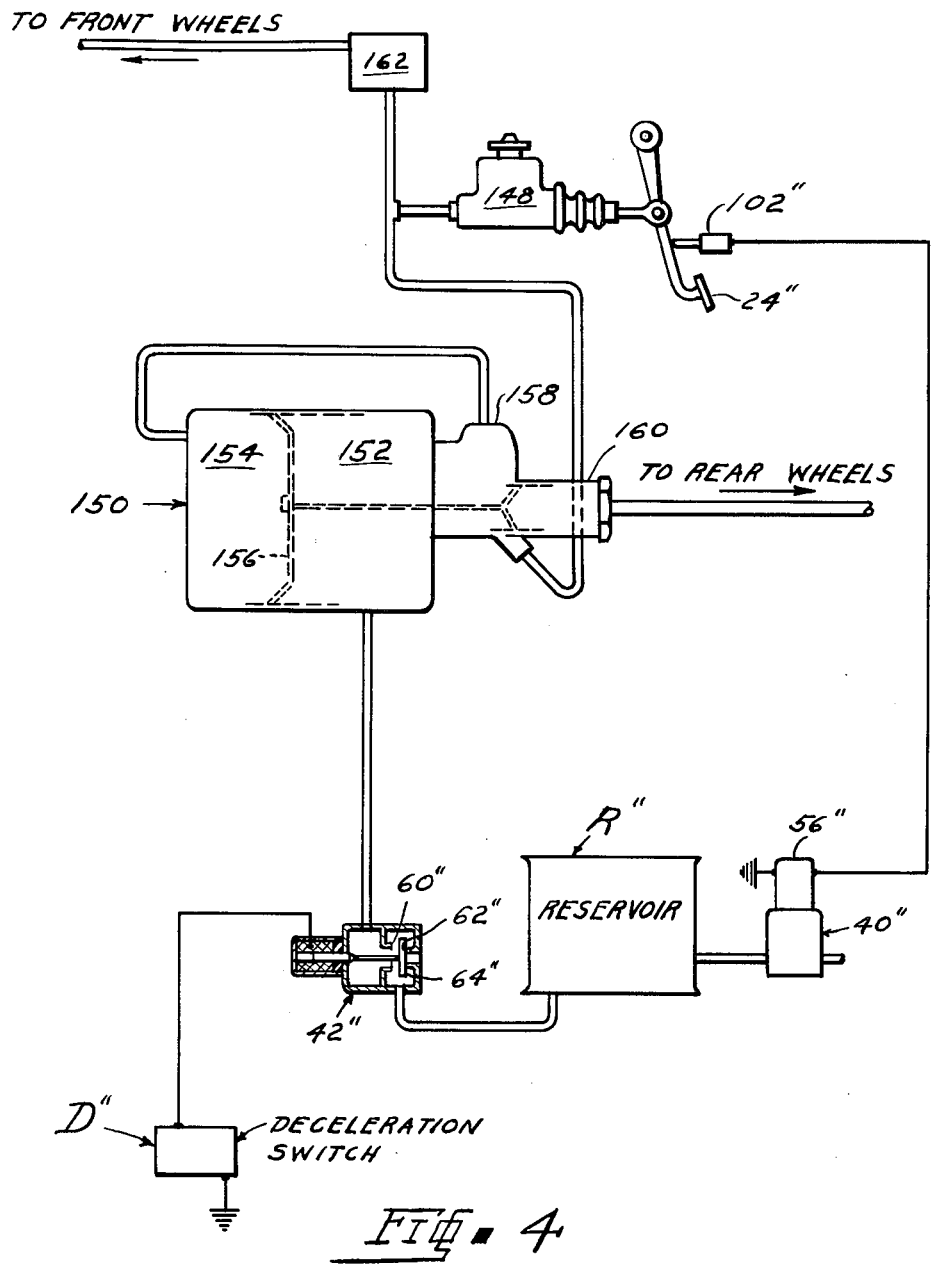

United States Patent Office 3,232,676
Patented Feb. 1, 1966

3,232,676
ANTI-SKID SYSTEM
Maxwell L. Cripe, South Bend, Ind., assignor to The Bendix Corporation, a corporation of Delaware
Filed Jan. 2, 1962, Ser. No. 163,398
6 Claims. (Cl. 303—21)

The present invention relates to anti-skid systems generally; and more particularly to anti-skid systems for automotive vehicles.

An object of the present invention is the provision of a new and improved anti-skid system which is simple in design, rugged in its construction, and inexpensive to manufacture.

A more specific object of the present invention is the provision of a new and improved anti-skid system for a vehicle having a brake actuated by means of an air motor, said system including: a pneumatic reservoir that is used to actuate the air motor, and means for adjusting the pressure level of the reservoir until its pressure level will no longer slide the brakes when communicated to said air motor.

A still more specific object of the present invention is the provision of a new improved anti-skid system for a vehicle having a brake operated by an air motor, and wherein a pneumatic reservoir is provided for communication with the air motor to actuate the brakes, said system further including means for sequentially bleeding air to the air motor, and thereafter connecting the air motor to the reservoir and repeating the sequence until the pressure level in the reservoir will no longer slide the wheel when communicated to the air motor.

Another object of the present invention is the provision of a new and improved anti-skid system of the immediately above mentioned type wherein a modulating control valve is normally communicated with the air motor to operate the brake; and wherein means are provided, once a sliding of the vehicle wheel is produced, for valving off the modulating valve from the air motor, and thereafter inducing the above mentioned sequential stepwise operation of applying and releasing the brake until the pressure level in the reservoir will no longer slide the vehicle wheel.

The invention resides in certain constructions and combinations and arrangements of parts; and further objects and advantages of the invention will become apparent to those skilled in the art to which it relates from the following description of several preferred embodiments described with reference to the accompanying drawings forming a part of this specification, and in which:

FIGURE 1 is a schematic view of an automotive braking system embodying principles of the present invention;

FIGURE 2 is a cross sectional view through a deceleration sensing device shown in FIGURE 1;

FIGURE 3 is a schematic view of another embodiment of an automotive braking system embodying principles of the present invention; and FIGURE 4 is a schematic view of still another embodiment of an automotive braking system embodying principles of the present invention.

The automotive braking system shown in FIGURE 1 generally comprises a pneumatic fluid pressure servomotor driven master cylinder A whose hydraulic discharge is used to actuate the front wheel brakes of the vehicle; and a pneumatic pressure motor driven master cylinder B whose hydraulic discharge is used to actuate the rear wheel brakes of the automotive vehicle. The fluid pressure motors of the units A and B may be of the type which are actuated by superatmospheric pressure, or as shown in the drawing, may be of the type which is actuated by vacuum-to-atmospheric pressure differential. The fluid pressure motors of the units A and B may also be of the type in which the pressure differing from atmospheric is normally supplied to both sides of its movable wall, and actuation is produced by bleeding atmospheric pressure to one of its chambers; or as shown in the drawings, may be of the atmospheric suspended type in which the pressure differing from atmospheric pressure is communicated to the motor to actuate the same.

The pneumatic servomotor 10 of the unit A is of the type that has a vacuum supply line 14 communicated by means of an internal flexible hose, not shown, to a control valve that is mounted on the differential pressure actuated movable wall, also not shown, within the servomotor 10. The unit's control valve is actuated by means of a push rod 22 that is pinned to the brake pedal lever 24. Atmospheric pressure normally exists on both sides of the internal movable wall; and upon depressing of the brake pedal lever 24, vacuum from the supply line 14 is communicated to the front side of its internal movable wall to thereby actuate the front wheel brakes of the vehicle. The same vacuum that is used to actuate the fluid pressure servomotor 10 is also communicated through the control line 26, normally opened valve 28, and control line 30 to the rear side of the movable wall of the atmospheric suspended air motor 12. As vacuum is admitted to the rear side of the movable wall in the air motor 12, air pressure on the front side of the movable wall produces a rearward movement of its internal parts which displaces hydraulic fluid from the master cylinder B to actuate the rear wheel brakes of the vehicle. It will therefore be seen that a simultaneous actuation of the front and rear wheel brakes is normally produced by the single control valve structure mounted within the servomotor 10.

According to principles of the present invention, means are provided for limiting the pressure which is supplied to the air motor B to a level which will just be below that required to produce a sliding of the rear wheel of the vehicle. It will be understood however that the principles of the present invention can be used to control either the front wheels or the rear wheels of a vehicle. Inasmuch as the rear wheels of a vehicle normally slide before its front wheels and the weight on the front wheels of an automotive vehicle normally increases during a braking application, it is desired, in the embodiment shown in the drawing, to only regulate the pressure which is supplied to the motor actuating the rear wheel brakes so that the operator will have complete manual control of his front wheel brakes at all times.

The mechanism shown in FIGURE 1 for controlling the brake application of the rear wheels generally comprises a reservoir R which has a capacity that is at least as great, and preferably more than twice as great as the volume of the chamber which lies rearwardly of the movable wall in the air motor 12. Vacuum of the same intensity that is normally supplied to the connection 14 is also supplied to the reservoir R through the vacuum supply line 38, and a normally opened valve 40. Vacuum from the reservoir R is communicated through a normally opened valve 42 to a normally closed port 44 in the control valve 28 so that the reservoir R is not communicated to the air motor 12 until the control valve 28 is actuated. The anti-skid mechanism shown further includes a deceleration sensing device D which may be of any suitable type, and which is shown in FIGURE 1 to be of the type which senses a predetermined rate of deceleration of the rear wheels. The deceleration sensing device D shown in FIGURE 1 is driven by the usual speedometer drive cable 46 which operates off of the drive shaft to the rear wheels, and so that a slide is sensed by either of the vehicle's rear wheels.

As previously indicated, it is desired to reduce the pressure within the reservoir R until it, when communicated to the air motor 12, will no longer produce a brake actuation which slides the rear wheels of the vehicle. The mechanism shown in FIGURE 1 accomplishes this in a stepwise operation wherein:

(1) Vacuum is communicated to the air motor 12 to slide the rear wheels of the vehicle;

(2) Atmospheric pressure is communicated to the air motor 12 to release the rear wheel brakes;

(3) The air motor 12 is communicated with the reservoir R to again actuate the air motor 12, and at the same time reduce the level of pressure in the reservoir R; and (4) A slide of the rear wheels is sensed, whereupon if a slide occurs, atmospheric pressure is again bled into the air motor 12 and the process repeated until a subsequent communication of the reservoir R with the air motor 12 no longer will produce a sufficient brake application to slide the rear wheels of the vehicle.

Although three separate valves 28, 40 and 42 have been shown as being used to control the anti-skid operation of the braking system shown in FIGURE 1, it is not intended that three separate valve structures will be needed in all instances, nor that the operation of the valves be solenoid actuated.

The valve structure 40 shown in FIGURE 1 serves the function of normally supplying vacuum to the reservoir R, and isolating the vacuum reservoir R from the vacuum supply when the braking system is actuated. The vacuum supply valve 40 includes a vacuum supply port 48, to which the supply line 38 always communicates, and a poppet member 50 which is drawn up into engagement with the valve seat 52 surrounding the vacuum port 48 to close off communication with the reservoir R. In the valve structure shown in FIGURE 1, poppet member 50 is drawn up into engagement with the valve seat 52 by means of an armature 54 of a normally deenergized solenoid 56. A spring 58 is provided to normally hold the poppet member 50 in its valve open position.

The two position control valve 42 has a pair of valve seats 60 and 62 which face each other, and which are adapted to be alternatively closed off by the poppet member 64. Atmospheric pressure is continually communicated to the port surrounded by the valve seat 62, and vacuum from the reservoir R is continually communicated to the valve port surrounded by the vacuum valve seat 60. The space between the valve seats 60 and 62 is continually communicated to the normally closed port 44 of the control valve 28; and the poppet member 64 is moved between its two valve seats 60 and 62 by means of an armature 66 of the solenoid 68. A coil spring 70 is provided to close off the atmospheric valve seat 62 whenever the solenoid 68 is deenergized.

The two position control valve 28 likewise has a pair of valve seats 72 and 74 which face each other and which are adapted to be alternatively closed off by means of the poppet member 6. The valve seat 72 surrounds the valve port 44 previously referred to, and valve seat 74 surrounds a valve port which is at all times in communication with the servomotor 10. The poppet member 76 is normally forced into engagement with the valve seat 72 by means of the coil spring 78 and the poppet member 76 is pulled into sealing engagement with the valve seat 74 by means of an armature 80 of the solenoid 82.

The control of the valves 28, 40 and 42 can be had in any number of ways, and is shown in FIGURE 1 as controlled by a normally opened switch 84 which in turn is actuated by the deceleration sensing device D. Whenever the deceleration sensing device D senses a skid of the rear wheels, the normally opened switch 84 closes an electrical circuit that includes a battery 86 and ignition switch 88 to simultaneously energize the solenoid 68 and an actuating coil 90 of a relay 92. Energizing of the actuating coil 90 pulls the armature 94 downwardly to close the contacts 96 and 98 of a holding circuit that includes the holding coil 100, solenoid 82, and solenoid 56. The elements of the holding circuit are arranged in series, and further includes a normally closed interrupting switch 102 which breaks the circuit whenever the brake pedal lever 24 is permitted to retract to its brake releasing condition. Each of the solenoids are quick acting; and by means of the series circuit shown, the operator can allow the brake pedal lever 24 to quickly retract and then apply the brakes again to build up the vacuum in the reservoir R above the level which the anti-skid mechanism had previously established.

The deceleration sensing device D may be of any suitable type and as shown in the drawing is an over-running type of mechanism having a flywheel 104 having an axis of rotation 106 extending therethrough. Flywheel 104 has an axially extending opening 108, and the threaded end 114 of a drive shaft 116 extends through the bushing 112. The bushing 112 has three small openings 118 therethrough which are spaced apart from each other lengthwise of the shaft of the bushing by distances which correspond with the spacing between the annular grooves 110 in the flywheel 104. The openings 118 are spaced 120° apart around the bushing, and a ball bearing is placed through each of the openings 118 so that the outer portion of each of the ball bearings ride in the grooves 110 while the inner portion of the ball bearings ride in the threads of the end portion 114 of the drive shaft 116.

The drive shaft 116 is adapted to be driven counterclockwise as seen from the top of FIGURE 2. A drive pin 122 is provided through the shaft 116 upwardly of the flyweight 104, and a retarding pin 124 is provided on the bottom end of the threaded portion 114 below the flyweight 104. The pins 122 and 124 are spaced apart a greater distance than the axial length of the bushing 112, and an abutment surface 126 is provided on the upper end of the bushing to oppose rotation of the pin 122 while an abutment surface 128 is provided in the bottom end of the bushing to engage the retarding pin 124. The shaft 116 may be journalled to its housing in a conventional manner.

The flywheel 104 and bushing 108 are normally supported in a position intermediate the pins 122 and 124 wherein the abutments 126 and 128 are held out of engagement with the pins by means of a coil spring 132 which acts on one end of a pivoted lever 134. The pivoted lever 134 has an abutment 136 intermediate its pivot and spring 132 which is biased upwardly against a bracket 138 that is attached to the flywheel 104 so that the flywheel and bushing are centrally located in the normal condition of the spring 132. When the flywheel 104 and shaft 116 are rotating at the same speed, the ball bearings 120 remain stationary and the parts revolve in unison.

When the speed of rotation of the shaft 116 exceeds that of flywheel 104, ball bearings 120 roll along the threads of the shaft to move the bushing 112 upwardly along with the flywheel 104. When the abutment surface 126 of the bushing engages the pin 122, however, the bushing 112 is caused to rotate at the same speed as the shaft 116 to thereby hold the ball bearing 120 at a fixed position on the threads of the shaft 116 and the ball bearings are swept around the grooves 110. A sliding action of the ball 120 occurs in the groove 110 by reason of the fact that the inside portion of the ball is not moving with respect to the threads of the shaft 116 so that the resulting friction gradually brings the flywheel 104 up to the same speed as the shaft 116.

During a deceleration of the shaft 116, the flywheel 104 rolls the balls 120 down the threads of the shaft 116 to carry the bushing 112 downwardly. This continues until the abutment surface 128 engages the retarding pin 124; whereupon the balls are held stationary with respect to the shaft 116, and the ball bearings 120 again slip around the grooves 110 to produce friction which gradually brings the flywheel 104 into synchronous rotation with the shaft 116. It will readily be seen that downward movement of the flywheel 104 is opposed by the strength of the spring 132, and that this can be adjusted so as to require a predetermined rate of deceleration in order to move the pivot arm 134 downwardly to actuate the normally opened switch 84.

Where the bushing 112 is normally held centered between the pins 122 and 124 so that the pins 122 and 124 clear the respective abutment surfaces 126 and 128, the structure so far described will sense both acceleration and deceleration of the shaft 116. Since in the present instance it is only necessary to sense deceleration, it would be possible to have the spring 132 normally hold the bushing 112 upwardly to where the pin 122 would normally engage the abutment surface 126. With this arrangement the flywheel 104 would normally accelerate simultaneously with the shaft 116 without any momentary delay or shifting.

As a further refinement, it may be desirable in some instances to attach a vehicle deceleration sensing weight 139 to the pivoted lever 134 to provide a force which opposes downward movement of the flywheel 104 when the vehicle's brakes are applied and no skidding of the wheels occurs. With this arrangement the switch 84 would not be closed therefore when the deceleration of the shaft 116 is proportional to the deceleration of the vehicle as sensed by the weight 139. When a slide of the wheels of the vehicle occurs, however, an unbalance of the rates of deceleration of the shaft 116 and weight 139 occurs; inasmuch as the shaft deceleration is very rapid, while substantially no deceleration is sensed by the weight 139. This of course allows the flywheel 104 to move downwardly to close the switch 84 in the same manner above described; and this arrangement has the advantage in that the rate of vehicle deceleration is used to determine a slide condition of the wheels rather than to relay solely on rates of deceleration of the shaft 116 above a predetermined rate.

In the operation of the system above described, a depressing of the foot pedal lever 24 causes vacuum to be communicated to the front side of the motor 10, and thereby produce an application of the front wheel brakes. Simultaneously therewith, the vacuum which actuates the motor 10 is also transmitted through the control line 26, and the normally opened valve seat 74, to the air motor 12 which actuates the rear wheel brakes. The valve seat 74 remains open so long as a sliding condition is not produced on the rear wheels of the vehicle.

Should a slide occur, however, the deceleration sensing device D of course responds to a sudden slow up in rotation of the shaft 116 to close the switch 84, and thereby simultaneously energize the actuating coil 90 of the relay 92, and the solenoid 68 of the control valve 42. Actuation of the relay 92 causes the solenoids 82 and 56 to be energized, and to stay energized; inasmuch as the original actuation of the control pedal 24 caused the switch 102 to close its contacts. Energization of the solenoid 82 causes its poppet 76 to close the valve seat 74 to communicate its control port 44 with the air motor 12.

The previously referred to energization of the solenoid 68 causes its poppet 64 to close off the valve seat 60 and open its valve seat 62 to communicate atmospheric pressure to the air motor 12. At the same time the solenoid 56 was also energized to cause its poppet member 50 to close off its valve seat 52, and thereby isolate the reservoir R. Airflow through the port of the valve seat 62 causes the air motor 12 to release the rear wheel brakes; whereupon the deceleration sensing device D responds to an increase in speed of the shaft 116 to allow the switch 84 to again open. At this time, only the solenoid 68 is deenergized, and this allows the coil spring 70 to force the poppet member 64 into sealing engagement with the valve seat 62 and open the valve seat 60. This shuts off atmospheric communication with the air motor 12, and simultaneously communicates the air motor 12 with the reservoir R. This again actuates the air motor 12, while at the same time reducing the vacuum within the reservoir R so that the rear wheel brakes will now be actuated with a force which is less than that previously used. If the new rear wheel brake application again produces a slide of the vehicle's rear wheels, the deceleration sensing device D again closes the switch 84 to lift the poppet 64 into engagement with the valve seat 60 and open atmospheric communication to the air motor 12. This will of course again release the rear wheel brakes to permit the switch 84 to again be opened so that the poppet 64 will again be forced downwardly by the spring 70 to close off its valve seat 62 and open its valve seat 60. This will again actuate the air motor 12 but with an actuating force which is still further reduced from the previous application. If the rear wheel brakes no longer slide, the switch 84 remains open and the reservoir R stays in communication with the air motor 12 to maintain the now established brake application.

All during the previous cycling of the deceleration sensing device D, the anti-skid mechanism's poppet member 76 remains in engagement with the valve seat 74 to isolate the servomotor A from the rear brake actuating unit B so that the operator has complete control of the braking application being developed at his front wheels. If after an anti-skid adjustment of the brake applying force to the rear wheels, the poor road conditions should have improved, the operator may remove the anti-skid control by quickly releasing the control lever 24 to open the switch 102; whereupon the poppet 76 will move over into engagement with the valve seat 72, and thereafter continually communicate the servomotor A with the rear brake actuating unit B (unless of course another skid should develop).

The embodiment shown in FIGURE 3 of the drawings operates generally in the same manner as that described for FIGURE 1 above but differs principally in the type of deceleration sensing mechanism which is used to detect a skid condition. Those portions of FIGURE 3 which are similar to corresponding portions in FIGURE 1 are designated by a like reference numeral characterized further in that a prime mark is affixed thereto.

The skid sensing device of FIGURE 3 generally comprises a pendulum 140 that is positioned forwardly of the normally opened switch 84' in such manner that the switch 84' remains open when the pendulum 140 is in its center position. Forward movement of the pendulum 140 is opposed by the piston 142 of the hydraulic cylinder 144 which is supplied with pressure from the master cylinder A' which actuates the front wheel brakes. The hydraulic cylinder 144 is so sized that it will be overpowered by the pendulum 140 whenever a non-skid condition exists; and will force the pendulum 140 rearwardly to close the switch 84' when a sliding of the rear wheels occurs. Closing of the switch 84' simultaneously actuates the solenoids 82' and 56' to isolate the reservoir R', and close off communication between the servomotor A' and the rear brake actuating motor B'. A conventional governor switch 146, driven by the drive shaft to the rear wheels, is placed in electrical series circuit with the solenoid 68′. The switch 146 is adjusted to close its contacts whenever the rear wheels approach a stationary condition, and to open its contacts whenever the rear wheels move at a rate of a few miles per hour.

When the brakes are applied and a skid occurs, the switch 84′ is closed to valve off the reservoir R₁ and disconnect the servomotor 10′ from the rear brake actuating motor B′. Upon a stoppage of rotation of the rear wheels, the governor switch 146 energizes solenoid 68′ to dump air to the motor 12′ while closing the valve seat 60′. This of course release the brake application on the rear wheels whereupon a subsequent rotation of the rear wheels opens the governor switch 146 to close the atmospheric valve seat 62′ and again communicate the reservoir R′ with the motor 12′. During this increase in speed of rotation of the rear wheels, the pendulum 140 remains in its rearward position and the switch 84′ is held closed. Rotation of the rear wheels may again open the governor switch 146 to repeat the cycle as many times as is necessary to reduce the level of vacuum in the reservoir R′ to a value which will no longer produce a skidding of the rear wheels.

The braking system shown in FIGURE 4 is of the type in which the hydraulic discharge from a conventional master cylinder 148 is delivered to a pneumatic servomotor driven fluid pressure intensifying unit 150 whose discharge in turn is used to actuate the brakes of the vehicle. The servomotor portion of the fluid pressure intensifying unit 150 is of the vacuum submerged type in which vacuum of equal intensity is delivered to the normally vacuum submerged chamber 152 and the control chamber 154 on opposite sides of the movable wall 156 during its normal non-actuated condition. The fluid pressure intensifying unit 150 includes a control valve 158 which is responsive to the hydraulic pressure from the master cylinder 148; such that upon receiving a pressure signal from the master cylinder, it valves off vacuum communication with the control chamber 154 and bleeds in atmospheric pressure to actuate the servomotor and displace fluid from its hydraulic chamber 160 to the rear wheel brakes. The pressure which is developed in the hydraulic chamber 160 is at all times greater than, but proportional to, that received from the master cylinder 148. For a more complete understanding of the fluid pressure intensifying unit 150 shown in the drawing, reference may be had to the E. J. Ringer Patent 2,617,261.

The anti-skid control mechanism shown in FIGURE 4 operates in a manner similar to that shown in FIGURE 1; and differs principally therefrom in that it regulates the pressure in the normally vacuum submerged chamber 152 instead of the control chamber 154. Those portions of FIGURE 4 which correspond to similar portions of FIGURE 1 are designated by like reference numerals, characterized further in that a double prime mark is affixed thereto.

In the embodiment shown in FIGURE 4, all of the vacuum which is supplied to the vacuum submerged chamber 152 passes through the valve structure 40″, reservoir R″, and normally opened valve seat 60″ of the two position control valve 42″, to the vacuum submerged chamber 152. The solenoid 56″ is energized to close off the vacuum supply valve 40″ whenever the brake pedal lever 24″ is actuated, by means of the normally closed switch 102″, which is only open when the pedal 24″ is in its full brake releasing position. The deceleration switch D″ is identical to that shown in FIGURES 1 and 2, and the solenoid 60″ is directly actuated by the deceleration switch D″ so that its valve seat 60″ is closed off, and the port through its atmospheric valve seat 62″ opened, whenever a skid of the rear wheels occurs. This of course bleeds atmosphere pressure into the normally vacuum submerged chamber 152 to decrease the differential pressure across its power piston 156, to thereby decrease the braking application on the rear wheels. When the rear wheels again start to rotate, deceleration switch D″ opens, poppet member 64″ abuts the valve seat 62″, and to again communicate the reservoir R″ to the submerged chamber 152. This again increases the differential pressure across the power piston 156 but to a lesser extent than was previously developed by the reservoir R″; and should a slide of the rear wheels again occur, another cycling operation is initiated. This may continue until the vacuum level in the reservoir R′ will no longer produce a sliding of the rear wheels for the amount of vacuum which was previously established in the control chamber 154. The system shown in FIGURE 4 has the advantage that the operator may at any time depress the pedal lever 24″ further to again actuate the valve 158 and decrease the amount of vacuum held in the control chamber 154—thereupon the anti-skid mechanism may again be called upon to cycle, should a slide occur. While the discharge of the hydraulic cylinder 160 has been shown to actuate the rear wheels only, it could in some instances be used to actuate both the front and rear wheels. In the embodiment shown in FIGURE 4, however, the discharge from the master cylinder 148 is also supplied to another fluid pressure intensifying unit 162, similar to the unit 150, but which does not include the anti-skid cycling mechanism.

It will be apparent that the objects heretofore enumerate as well as others have been accomplished; and that there has been provided an anti-skid mechanism to be used in conjunction with brake actuating air motors either of the superatomspheric, or subatmospheric type, as well as with either atmospheric suspended, or fluid pressure submerged motors, and wherein the motors are actuated by means of a reservoir whose pressure is regulated until its pressure level will no longer produce a brake actuation which slides the vehicle's wheels.

While the invention has been described in considerable detail, I do not wish to be limited to the particular embodiments shown and described; and it is my intention to cover hereby all novel adaptations, modifications, and arrangements thereof which come within the practice of those skilled in the art to which the invention relates.

I claim:

1. In an anti-skid braking system having a fluid pressure motor which operates a brake for a vehicle wheel: control means for initiating actuation of said fluid pressure motor, second means sensing a predetermined rate of deceleration of the vehicle wheel; a fluid pressure reservoir of predetermined volume; third means normally communicating said reservoir with a fluid pressure supply differing from atmosphere, and isloating said reservoir from said supply during the time said control means and said second means are actuated; and forth means for communicating atmospheric pressure to said fluid pressure motor until its pressure level will no longer actuate said motor with sufficient force to slide the vehicle wheel, and a holding means operatively connected to said control means and said second means such that said second means thereafter automatically causing said fourth means to communicate said reservoir said motor.

2. An anti-skid braking system for a vehicle having a pneumatic pressure motor operated wheel brake and comprising: a pneumatic reservoir of predetermined volume having a supply connection, a normally used control valve for actuating said pneumatic pressure motor, first means for sensing a deceleration of the vehicle wheel greater than a predetermined rate, second means operatively connected to said first means closing off said supply connection of said reservoir when said control valve is actuated and a deceleration of the vehicle wheel greater than a predetermined rate is sensed, and third means actuated when said first means senses a deceleration above said predetermined rate for sequentially communicating a chamber of said pneumatic pressure motor to atmosphere to release the brake and thereafter communicating said chamber to said reservoir to again apply the brake, and holding means continuing said sequential operation until the pressure level of said reservoir will no longer cause said pneumatic pressure motor to slide the vehicle wheel.

3. In an anti-skid braking system having a pneumatic pressure motor which operates a brake for a vehicle wheel: a brake control lever; a normally open switch means which is closed by actuation of said brake control lever; a modulating valve actuated by said lever for regulating pressure in said pneumatic pressure motor; a pneumatic reservoir of predetermined volume having a supply connection; deceleration sensing means including a governor means sensing deceleration of said vehicle wheel above a predetermined rate; first valve means controlled by said deceleration sensing means and said normally open switch means, said valve means when said governor means senses wheel deceleration greater than a predetermined rate and said normally open switch means is closed due to actuation of said brake control lever closes off said reservoir supply connection, separating said modulating valve from said pneumatic pressure motor, and communicating said reservoir to said pneumatic pressure motor, a holding means maintaining said valve means actuated after said deceleration sensing means has energized said holding means so long as said brake control lever is actuated; and second valve means actuated whenever said deceleration sensing means senses a deceleration above said predetermined rate for sequentially communicating a chamber of said pneumatic pressure motor to atmosphere to release said brake and thereafter communicate said chamber to said reservoir to again apply said brake, and continuing said sequential operation until the pressure level of said reservoir will no longer cause said pneumatic pressure motor to slide the vehicle wheel.

4. In an anti-skid braking system including a fluid pressure servomotor having a control chamber to which a pressure differing from atmosphere is communicated to actuate the front wheel brakes of a vehicle, and including a separate pneumatic pressure motor for actuating the rear wheel brakes of the vehicle: a control lever actuated control valve for regulating communicating of the control chamber of said servomotor with said pressure which differs from atmosphere; a normally open switch means which is closed upon actuation of said control valve; a deceleration sensing device which is actuated by rates of deceleration of a rear wheel greater than a predetermined rate; a pneumatic reservoir having a predetermined volume greater than that of said control chamber; first valve means having a control member which when in one position communicates a supply of said pressure differing from atmosphere to said reservoir, and which when in another position closes off said supply to said reservoir; second valve means having a control port, said second valve means having a control member which communicates said control port to said reservoir when said control member is in a first position, and which communicates said control port to the atmosphere when said control member is in a second position; third valve means having a control member which communicates said control chamber of said servomotor with said pneumatic pressure motor when its control member is in one position, and which communicates said control port of said second valve means with said pneumatic pressure motor when its control member is in another position, said control member of said second valve means moving to its second position each time said deceleration sensing device is actuated said normally open switch is closed as by actuation of said control valve, and said control means of said first and third valve means moving to their other positions when said deceleration sensing means is actuated and said normally open switch means is closed as by actuation of said control valve and a holding means operatively connected to said normally open switch means and said deceleration sensing means to maintain said control members of said first and third valve means to close off communication of supply to said reservoir as long as said control lever is actuated 5. In an anti-skid braking system for a vehicle including a pneumatic pressure motor for actuating a brake for a vehicle wheel: a control valve for regulating communication of a pressure which differs from atmosphere to said pneumatic pressure motor to actuate the brake; a deceleration sensing switch which is actuated by rates of deceleration of said wheel greater than a predetermined rate; a pneumatic reservoir having a predetermined volume greater than that of said pneumatic pressure motor; first solenoid operated valve means having a control member which when deenergized communicates a supply of said pressure differing from atmosphere to said reservoir, and which when energized closes off said supply to said reservoir; second solenoid operated valve means having a control port, said second valve means having a control member which communicates said control port to said reservoir when said solenoid is deenergized and which communicates said control port to atmosphere when said solenoid is energized; third solenoid operated valve means having a control member which communicates said control valve with said pneumatic pressure motor when deenergized and which communicates said control port of said second valve means with said pneumatic pressure motor when energized, said control member of said second valve means moving to its energized position each time said deceleration sensing switch is actuated; a second switch which is open when said control lever is in its brake releasing condition and which is closed when said control lever is actuated; a rely solenoid energized by the actuation of said deceleration sensing switch, said solenoid actuating an armature having a holding coil circuit that is closed by the actuation of said armature, and said holding coil circuit being in series with said second switch and said first and third solenoid operated valve means.

6. An anti-skid braking system for a vehicle having a pneumatic pressure motor operated wheel brake and comprising:

a deceleration means sensing a skidding of the wheel brake;

a control means in fluid communication with the arranged to actuate said pneumatic pressure motor, said control means having a switch means operative to close a circuit upon actuation of said control valve;

a holding circuit operatively connected to said deceleration means and said switch means to be actuated by said deceleration means and released by said switch means;

a pneumatic reservoir of predetermined volume having a supply connection;

a first valve means for closing off communication of said control means when said deceleration means has actuated said holding circuit and holding same until said deceleration means no longer senses a skidding of the wheel brake and said switch is opened by a deactuation of said control means, said first valve means having conduits in fluid communication with said reservoir and said control valve arranged so that when communication is closed between said control valve and said pneumatic pressure motor communication is open between said reservoir and said fluid pressure motor;

a second valve means in one of the conduits forming the fluid communication between said first valve means and said reservoir, which second valve means operatively connects said reservoir to said first valve means or to inlet in said second valve means supplied with a pressure differing from that in said reservoir, said second valve means being actuated and released by said deceleration means whereby pressure differing from said reservoir is supplied to said pneumatic pressure motor until said motor's pressure lever is lower than that which would skid said wheel brake and thereafter recommunicate said reservoir; and a third valve means operatively connected to said switch means to close-off said supply connection to said reservoir when said control means is actuated to close said switch means to allow the pressure level of said reservoir to progressively reach a value which will no longer skid the wheel brake.

References Cited by the Examiner

UNITED STATES PATENTS

| | | | |
|---|---|---|---|
| 2,818,244 | 12/1957 | Ropar | 264—1 |
| 2,841,387 | 7/1958 | Mortimer | 264—1 |
| 2,957,659 | 10/1960 | Yarber | 244—111 |
| 3,035,870 | 5/1962 | Beatty | 303—6 |
| 3,038,761 | 6/1962 | Kendrick | 303—6 |

EUGENE G. BOTZ, *Primary Examier.*